(12) United States Patent
Peters et al.

(10) Patent No.: US 12,736,798 B2
(45) Date of Patent: Sep. 15, 2026

(54) CENTERING AID FOR BORESCOPES

(71) Applicant: Lufthansa Technik AG, Hamburg (DE)

(72) Inventors: Jan Oke Peters, Hamburg (DE); Michael Thies, Hamburg (DE); Matthias Tewes, Hamburg (DE); Matthias Hoefener, Hamburg (DE); Lukas Bechheim, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 276 days.

(21) Appl. No.: 18/546,489

(22) PCT Filed: Feb. 17, 2022

(86) PCT No.: PCT/EP2022/053929
§ 371 (c)(1),
(2) Date: Aug. 15, 2023

(87) PCT Pub. No.: WO2022/175382
PCT Pub. Date: Aug. 25, 2022

(65) Prior Publication Data

US 2024/0302644 A1 Sep. 12, 2024

(30) Foreign Application Priority Data

Feb. 17, 2021 (DE) ..................... 10 2021 103 749.2

(51) Int. Cl.
*G02B 23/24* (2006.01)
*G01N 21/954* (2006.01)

(52) U.S. Cl.
CPC ....... *G02B 23/2492* (2013.01); *G01N 21/954* (2013.01)

(58) Field of Classification Search
CPC ............ G02B 23/2492; G02B 23/2476; G01N 21/954; B08B 9/00; B08B 2209/0553
USPC ............ 356/73, 237.1, 241.1–241.6; 348/65, 348/82–85; 600/302, 341–343, 381; 73/583, 593, 622, 865.8, 866.5
See application file for complete search history.

(56) References Cited

U.S. PATENT DOCUMENTS 5,140,265 A * 8/1992 Sakiyama ............ G01N 27/902 324/237
5,365,331 A 11/1994 Tamburrino et al.
5,969,275 A * 10/1999 Moe ..................... G01B 5/0002 73/866.5

(Continued)

FOREIGN PATENT DOCUMENTS

CN 1646848 A * 7/2005 ........... G01N 21/954
CN 106073687 A 11/2016

(Continued)

*Primary Examiner* — Robert R Raevis
(74) *Attorney, Agent, or Firm* — LEYDIG, VOIT & MAYER, LTD.

(57) ABSTRACT

A centering aid is for centering borescopes. The centering aid includes an elongate central body with a passage channel for borescope lines and with a spacer device. The spacer device extends variably in a radial direction over an entire circumference of the central body. The spacer device is configured to support the central body in at least two support planes which are mutually spaced apart along the central body and run perpendicularly to a longitudinal direction of the central body.

19 Claims, 6 Drawing Sheets

(56) References Cited

U.S. PATENT DOCUMENTS

| | | | | |
|---|---|---|---|---|
| 2003/0150285 | A1 * | 8/2003 | Tasca | F16L 55/38 73/865.8 |
| 2004/0083829 | A1 * | 5/2004 | Chapman | G01N 21/8806 73/865.8 |
| 2010/0152536 | A1 | 6/2010 | Iwasaki et al. | |
| 2019/0003464 | A1 | 1/2019 | Kassner | |

FOREIGN PATENT DOCUMENTS

| | | | | | |
|---|---|---|---|---|---|
| CN | 107440671 | A | | 12/2017 | |
| CN | 211554481 | U | | 9/2020 | |
| CN | 114046923 | A | * | 2/2022 | G01N 21/954 |
| EP | 2552293 | B1 | | 1/2015 | |
| EP | 3422510 | A1 | | 1/2019 | |
| JP | 60196662 | A | * | 10/1985 | |
| JP | 2012141419 | | * | 12/2010 | |
| JP | 2012141419 | A | | 7/2012 | |
| JP | 2018173436 | A | | 11/2018 | |
| KR | 20040022848 | A | * | 3/2004 | B08B 9/055 |
| KR | 20100063231 | A | * | 6/2010 | G01N 21/954 |
| KR | 101156421 | B1 | * | 6/2012 | G01N 21/954 |

* cited by examiner

CENTERING AID FOR BORESCOPES

CROSS REFERENCE TO RELATED APPLICATIONS

This application is a U.S. National Phase application under 35 U.S.C. § 371 of International Application No. PCT/EP2022/053929, filed on Feb. 17, 2022, and claims benefit to German Patent Application No. DE 10 2021 103 749.2, filed on Feb. 17, 2021. The International Application was published in German on Aug. 25, 2022 as WO 2022/175382 A1 under PCT Article 21(2).

FIELD

The present disclosure concerns a centering aid for borescopes and an assembly comprising such a centering aid and a borescope.

BACKGROUND

In the prior art, various methods are known for optical inspection of technical equipment such as, e.g. gas turbines or aircraft engines, wherein a borescope is introduced through a lateral opening into a fully assembled technical device in order to be able to visually inspect the interior of the device.

For example, to inspect the combustion chamber of a gas turbine, a flexible borescope is introduced and moved manually with continuous image capture until the combustion chamber has been completely recorded, i.e. at least one image has been taken for every region of the combustion chamber. Often, a flexible borescope is introduced along the entire inner periphery of a combustion chamber before then being slowly withdrawn. The aim is to ensure that the entire periphery of the combustion chamber has been inspected.

During such an inspection of the combustion chamber, the borescope—and in particular the image capture probe at the free end of the borescope—comes to lie on one of the inner walls of the combustion chamber or is suspended in free oscillation in the combustion chamber, wherein depending on the position of the image capture probe along the periphery, the probe assumes individual angles and distances (which cannot usually be reproduced) from the region of the combustion chamber to be inspected.

In addition, the position of the image capture probe is susceptible to movements relative to the combustion chamber during vibrations of the engine or the entire aircraft, e.g. because of wind effects or other maintenance work on the aircraft. In order nonetheless to be able to capture sharp images, the exposure time of the probe should be selected to be correspondingly short, but this has a negative effect on the image quality.

As a result, with the borescope methods known from the prior art, it is practically impossible to achieve a consistent quality of the captured images of the interior of a combustion chamber, in particular images showing damage. Also, no 3D scans can be produced with such a method, in particular because of unavoidable movements of the probe relative to the combustion chamber. Rather, if necessary, manual 3D imaging should be carried out afterwards using separate 3D borescopes designed for this.

The same applies to the boroscopy of a plurality of other technical devices.

SUMMARY

In an embodiment, the present disclosure provides a centering aid that is for centering borescopes. The centering aid includes an elongate central body with a passage channel for borescope lines and with a spacer device. The spacer device extends variably in a radial direction over an entire circumference of the central body. The spacer device is configured to support the central body in at least two support planes which are mutually spaced apart along the central body and run perpendicularly to a longitudinal direction of the central body.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
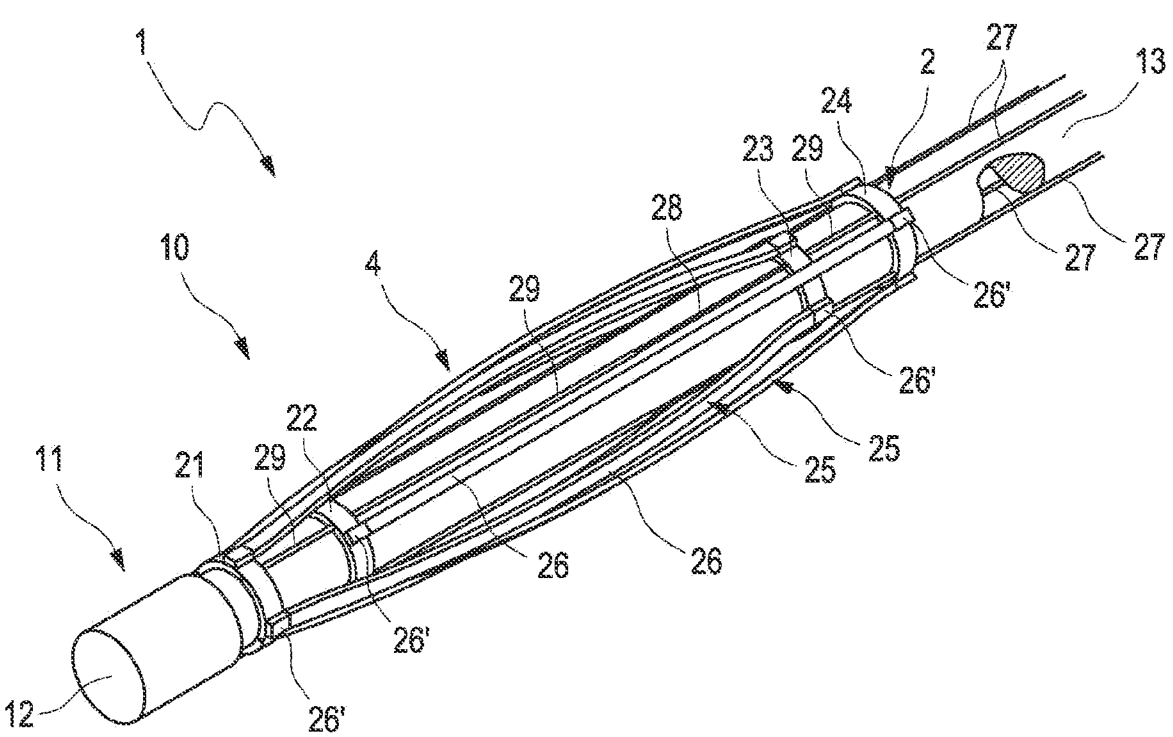
FIG. 1*a* and FIG. 1*b* show a first exemplary embodiment of a centering aid according to the present disclosure.
Figure 1:
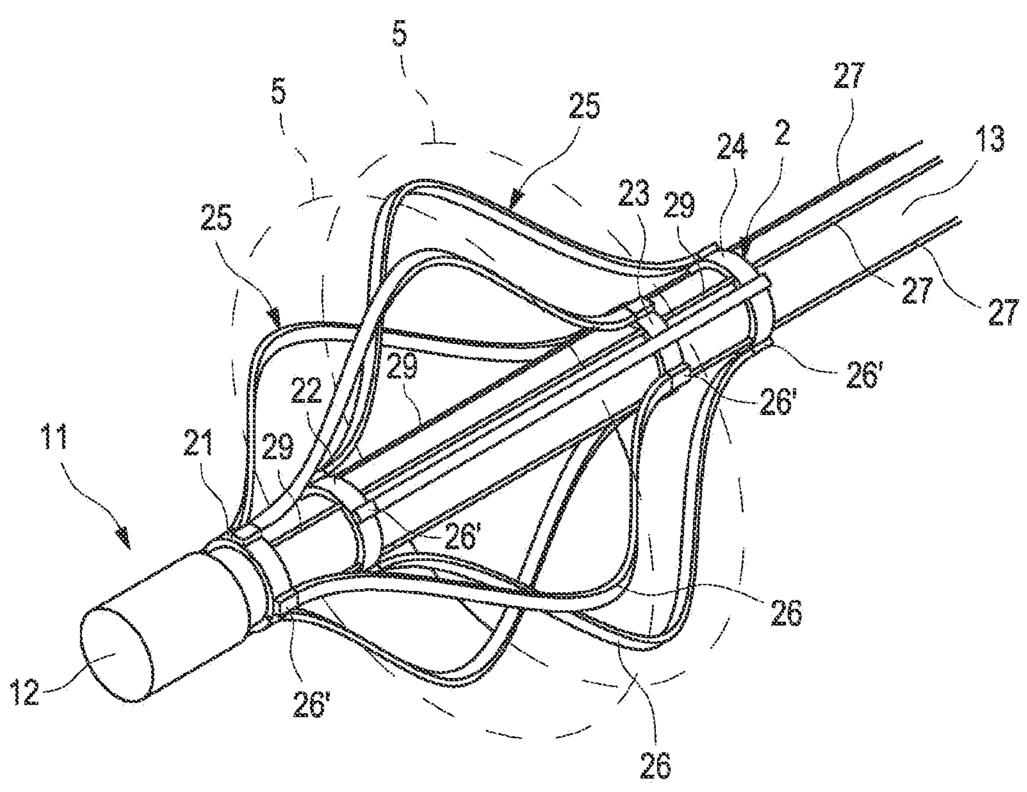

In an embodiment, the present disclosure provides a device for borescopes and a borescope assembly with which the disadvantages known from the prior art can at least be reduced.

Accordingly, aspects of the present disclosure concern a centering aid for borescopes comprising an elongate central body with a passage channel for borescope lines and with a spacer device, which extends variably in the radial direction over the entire circumference of the central body, for supporting the central body in at least two support planes which are mutually spaced apart along the central body and run perpendicularly to the longitudinal direction of the central body.

Aspects of the present disclosure furthermore concern an assembly comprising a borescope with a borescope head at one end of a borescope shaft in which borescope lines run, and a centering aid according to the present disclosure, wherein the centering aid is arranged directly adjacent to the borescope head and the borescope lines are routed through the passage channel of the centering aid.

Firstly, some terms used in connection with the present disclosure are explained.

A “borescope head” is the part of a borescope and/or the components at the free end of the borescope which are introduced into the object to be examined and finally determine the recording region of the borescope. For a purely optical borescope, this corresponds e.g. to the borescope lens or the inlet face of the optical waveguide which defines the actual imaging cone; in a video borescope, this is the imaging region of the image capture sensors provided for this. It is irrelevant whether the borescope head captures a 2D image in the visible range, images in the invisible range (e.g. infrared range), and/or 3D data e.g. by triangulation. The borescope head may also comprise further components such as e.g. additional sensors, light sources or drives for orientation of the image capture sensors.

In principle, the borescope head may be arranged on a rigid or flexible "borescope shaft". The shaft serves primarily for guiding the borescope head.

At the same time, "borescope lines" run in the borescope shaft. Depending on the design of the borescope head, the borescope lines comprise electrical lines for power supply to and/or data communication with components of the borescope head, and/or optical waveguides. Irrespective of the final transmission technology, the images captured at the borescope head are transmitted via the borescope lines to the other end of the borescope shaft where they are displayed, stored and/or processed further.

For reasons of greater clarity and better understanding, the terms "air cushion" and "compressed air" are used below in connection with advantageous embodiments of the present disclosure. However, any gases other than air may be used for filling the air cushions, so that said terms and their derivatives should not be understood as restricted to air as the compression or filling gas for the air cushion.

The present inventors have found that, in a borescope introduced through a small opening, such as, e.g. a bore provided for the purpose of boroscopy or other reasons, into a technical object, such as, e.g. an aircraft engine, the borescope head usually has no lateral guidance in the interior of the object to be inspected. If however the centering aid according to the present disclosure is provided adjacent to a borescope head, lateral support of the borescope head can be provided in the interiors to be inspected, even if these are significantly larger than the cross-section of the borescope head. Since the spacer device has a variable extent in the radial direction, a borescope equipped with the centering aid according to the present disclosure can still be introduced through conventional openings, which are suitable and/or provided for boroscopy, in a technical object if the radial extent of the spacer device is reduced accordingly. For definitive support of the borescope head in the interior of the technical object, the radial extent of the spacer device is then increased until this lies on the inner wall of the interior and thus supports the borescope head against the inner wall. Since in principle the support may be provided in at least two planes spaced apart from one another along the central body, usually the orientation of the borescope head is also established by the spacer device.

The variable extent of the spacer device in the radial direction may be ensured by elastic deformability of at least one radially extending component of the spacer device and/or by at least one component which can be expanded outwards in a radial direction in a controlled fashion.

In a preferred variant embodiment, the spacer device has at least two sets, which are offset in the longitudinal direction of the central body, of at least three—preferably four—elastically deformable strips distributed over the circumference of the central body, wherein each strip is guided at two guide points spaced apart in the longitudinal direction of the central body, and each strip can be expanded radially outwards by changing the ratio of the distance between its two guide points and the length of the strip between the two guide points. The expansion may be achieved by lateral deflection of the strips under axial compressive stress (i.e., elastic buckling), in particular comparable to one the Euler buckling cases 2 to 4, wherein because of the central body or a borescope line routed through its passage channel, in principle this buckling cannot take place in the direction of the central body but only away from this or towards the outside. The strips may in principle have an arbitrary design and in particular an arbitrary cross-section. In order to avoid or at least reduce a lateral deflection of the outwardly expanded strips, it is however preferred if the strips have a substantially rectangular cross-section, wherein the shorter side length runs in the radial direction of the central body. By corresponding choice of cross-section, it is ensured that the outward expansion of the individual strips takes place substantially in the radial direction.

Since at least two sets are arranged offset in the longitudinal direction of the central body, in principle the strips can provide support in at least two support planes, wherein usually each of the sets defines one of the support planes. The at least two sets may be arranged overlapping in the longitudinal direction of the central body. It is however also possible that the at least two sets are arranged completely one behind the other in the longitudinal direction of the central body.

In principle, it is possible to change the ratio of the distance between the two guide points and the length of the strip between the two guide points by changing the length concerned. A strip may be attached, e.g. at a first guide point, and at the other guide point be merely guided in the longitudinal direction, such that pressing-in a part of the strip protruding beyond the guide point increases the length of the strip between the two guide points, whereby the strip curves outward or expands outward.

It is however preferred that at least one strip can be expanded radially outwards by changing the distance between the two guide points while the length of the strip between the guide points remains the same. If the distance concerned is reduced so as to be smaller than the length of the strip, this expands outward and may thus serve for support. In order to change the distance between two guide points of a strip, it may be provided that the central body is divided into at least two parts, wherein the distance between at least two parts of the central body along a borescope line routed through the passage channel is variable, and at least one strip is fixedly attached to a respective guide point on a respective one of the two parts of the central body.

Here it is particularly preferred if the strips of a set at their respective first guide point are attached to a first common part of the central body, and at their respective other guide point to a second common part of the central body, wherein the first part of the central body can be attached axially immovably to a borescope line inserted through the passage channel, and the second part of the central body is designed to be axially displaceable relative to a borescope line inserted through the passage channel. It is however also possible that, for at least one set, both the first and the second part of the central body are in principle axially displaceable, wherein the displaceability of at least one of the two parts may be limited by other components of the spacer device or by third components.

If the sets are arranged completely one behind the other in the longitudinal direction of the central body, it is preferred if the strips of the individual sets are each attached at their guide points to separate parts of the central body. The two sets together with the respective parts of the central body may be constructed identically to one another, so that the spacer device finally consists of two identical assemblies or components arranged one behind the other along the borescope line. The spacer device may thus be extended arbitrarily to three or more sets of strips. The use of identical assemblies or components facilitates production.

In particular if, as well as one or more borescope line(s), the borescope shaft is also routed through the central body, at least one of the parts of the central body may be designed sliding on the borescope shaft. In particular in the case of an arrangement of sets of strips one behind the other in the longitudinal direction of the central body, it may also be advantageous if all parts of the central body except one are arranged sliding on the borescope shaft: the displacement of the part of the central body furthest removed from the non-sliding part of the central body gives the described outward expansion of the strips in principle for all sets, wherein because of the attachment to the elastically deformable strips, further sliding parts of the central body lying between said outer parts can also be "moved" on a reduction of the distance between the two outer parts, so that the distances between the two guide points are reduced for all strips.

Irrespective of this, the individual sets of the spacer device may each comprise separate first and second parts of the central body. Thus it is in principle possible to change the distances between the first and second parts individually for each set. It is however also possible that the first and/or second parts of the central body for different sets are at least partially formed as one piece. In other words, the guide points of the strips of two different sets may be attached to one or even both ends of a common part of the central body. In order in the latter case to achieve the desired arrangement of the sets offset in the longitudinal direction of the central body, the guide points of the individual sets may be arranged correspondingly offset.

Alternatively or additionally, spacer elements may be provided for determining the minimum mutual spacing of individual parts of the central body. Here, spacers may be arranged between parts of the central body at which respective guide points of strips of different sets are arranged, in some cases also serving to keep the support planes spaced apart from one another. Suitable spacers between parts of the central body, the relative mutual distance of which is in principle variable, may prevent the distance between the guide points of individual or all strips of individual or all sets being so low that the strips become twisted.

It is preferred if the distance between two parts of the central body can be changed via one or more Bowden cables. The Bowden cable(s) may be guided along the borescope shaft and thus allow a change of said distance from a remote position. It is particularly preferred if at least two individually actuatable Bowden cables are provided which are distributed over the circumference, for changing the distance between two parts of the central body. In particular, if the borescope line(s) routed through the central body, or a borescope shaft routed through this, are elastically deformable by bending, individual actuation of the Bowden cables may not only change the distance between two parts of the central body but usually also achieve a bending of the borescope in the region between the two parts of the central body. In this way, the orientation of the borescope head can be changed. The reset force of the strips after a change in distance between the parts of the central body is preferably sufficient to restore the initial distance between the parts of the central body when the Bowden cables used for changing the distance are completely released.

The strips and the central body may be made of plastic. It is possible and even preferred for the strips on at least some of the guide points to be formed integrally with the central body or the part of the central body on which the guide points are arranged. This gives a firm connection between the central body and strips, which can usually be regarded as a fixed clamping. In released state, the strips preferably have a slight curvature towards the outside relative to the central body, so that any change in the ratio of the distance between the two guide points and the length of the strip leads directly to a buckling of the strip.

For the above-mentioned embodiments of the spacer device, application cases are conceivable in which one set of strips is sufficient to guarantee adequate support. Thus with special shaping and/or stiffness distribution of the strips of the set, directly two support planes can be created. Depending on the design of the borescope with which the spacer variant is used, and/or the actual application case, it may however also suffice if only one set of strips is provided with in principle also only one support plane. Corresponding spacer devices with only one set of strips may require separate protection.

In a further embodiment variant, the spacer device may comprise at least one air cushion which is arranged on the central body and extends in the longitudinal direction of the central body, and which is optionally inflatable and deflatable via a compressed air supply. The compressed air supply may radially outwardly expand the at least one air cushion starting from the central body, e.g. until it lies against the inner wall of a technical object to be examined. The radial extent may be reduced again by extracting or evacuating the air in the air cushion, for which the compressed air supply is suitably refined or a separate compressed air outlet may be provided. Since the at least one air cushion still extends in the longitudinal direction of the central body, support in the two support planes provided according to an aspect of the present disclosure may be achieved already by the longitudinal extension of the at least one air cushion. The compressed air supply may, on use of the centering aid with a borescope, be a compressed air line routed along the borescope shaft, via which if required evacuation of the air cushion is possible.

The at least one air cushion may be a single annular air cushion extending around the central body. It is however also possible that that two or more air cushions are provided which are distributed over the circumference, which usually allows a simpler design of air cushions.

It is particularly preferred if the multiple air cushions are individually inflatable and deflatable. Controlled individual inflation and deflation allows planned changes to be made to the position and/or orientation of a borescope head relative to the inner wall of a technical object on which the air cushions rest. The positionability and/or orientability is increased in principle with the number of air cushions distributed over the circumference, wherein four or eight air cushions are usually sufficient for controlling the position and/or orientation. At the same time, the control system and the number of valves and/or supply lines necessary for controllability remain easy to handle and the fundamentally limited installation space is still achievable.

The at least one air cushion is made of highly elastic and/or temperature-resistant material, preferably allowing expansions of more than 2000% and/or temperatures up to 80° C., and/or an internal pressure of 0.5 to 5 bar. Materials with corresponding properties are well-known and have proved suitable for air cushions of the spacer device.

As an alternative to at least one air cushion, the spacer device may have radially extending, flexible bristles distributed over the circumference of the central body. The tips of the bristles may lie on an inner wall of an interior of a technical object to be inspected and thus support the central body. The length of the bristles may be adapted to the proposed application of a borescope equipped with the centering aid, in particular therefore to the interior of a technical device in which the borescope is to be introduced.

The bristles may be sufficiently flexible that a borescope equipped with a corresponding centering aid can still be introduced into a technical object through the provided borescope opening. In this case, the bristles should elastically deform or bend towards the central body sufficiently without being damaged.

In particular if this cannot be achieved purely by corresponding flexibility of the bristles, or if the achievable support from correspondingly flexible bristles is not sufficient, it may be provided that at least some of the flexible bristles are spring-mounted on the central body such that a corresponding bristle can be pivoted about an axis perpendicular to the longitudinal direction of the central body. Such pivotability may allow close contact of the bristles concerned on the central body, e.g. when being pushed through a borescope opening, without relying on the flexibility of the bristles themselves. By suitable matching of the flexibility of the bristles and the spring force of their spring-mounting, a good support can be achieved in the interior of a technical object without damage, wherein because of the spring-mounting of the bristles, the centering aid can still be introduced through a normally narrow borescope opening.

Irrespective of the design of the spacer device, it is preferred if the central body is flexibly bendable in the longitudinal direction. A corresponding flexible design allows the centering aid to pass even through narrow cavities which are not linear in course. The support planes then run perpendicularly to the longitudinal direction of the central body at each intersection with the respective support plane.

To explain the assembly according to aspects of the present disclosure, reference is made to the above statements.

In principle, with the use of the centering aid, it is possible that the borescope shaft as a whole is routed through the passage channel. It is however preferred if the borescope shaft terminates flush with the centering aid, so that only the borescope lines are routed through the passage channel to a borescope head arranged on the opposite side of the centering aid. The passage channel, and hence usually also the centering aid, may then have a smaller diameter than would be necessary for passage of the borescope shaft through the passage channel.

It is preferred if the cross-section of the central body perpendicular to the passage channel is smaller than or equal to the cross-section of the borescope head. With a corresponding design, it can usually be ensured that the assembly according to the present disclosure can be routed through the borescope openings for which the borescope is in principle designed. In determining a suitable cross-section size for the central body, where necessary the minimum radial expansion of the spacer device should be taken into account if this protrudes from the central body in this state.

FIG. 1 illustrates schematically a first exemplary embodiment of a centering aid 1 according to the present disclosure in an assembly 10 with a borescope 11. FIGS. 1*a* and 1*b* show the assembly 10 in different states of the centering aid 1.

The borescope 11 comprises a borescope head 12, which is arranged on a flexible shaft 13 through which the various borescope lines run. The centering aid 1 is arranged directly adjacent to the borescope head 12 on the borescope shaft 13.

The centering aid 1 comprises a central body 2 divided into four annular parts 21-24 which are spaced apart from one another in the longitudinal direction, wherein the two annular parts 21, 22 closest to the borescope head 12 are fixedly attached to the borescope shaft 13 by force fit and/or substance bonding, while the other two annular parts 23, 24 are displaceable along the borescope shaft 13. The annular parts 21-24 form a passage channel 3 through which the borescope shaft 13 is routed.

As a spacer device 4, in each case an immovable part and a movable part 21, 23 or 22, 24 of the central body 2 are fixedly connected to so-called guide points 26' via a respective set 25 of four elastically deformable strips 26 which are evenly distributed over the circumference. The strips 26 each have a rectangular cross-section, wherein the shorter side length runs towards the central body 2 in the substantially radial direction. The distance between the parts 21, 23 or 22, 24 of the central body 2 connected via a set 25 of strips 26 is selected such that, in the fully relaxed state shown in FIG. 1*a*, the strips 26 are curved slightly outward.

In total, four Bowden cables 27 are provided distributed over the circumference of the central body 2 and routed along the shaft 13 to its remote end. There, one end of the inner traction wires 28 is attached to the part 21 of the central body 2 closest to the borescope head 12. In addition, the traction wires 28 of the Bowden cables 27 are guided in spacers 29 in the regions between the parts 21-24 of the central body 2, wherein between the two fixed parts 21, 22 or the two movable parts 23, 24, the spacers 29 each terminate flush therewith or are formed integrally with the corresponding parts 21-24. The spacers 29 between the two inner parts 22, 23 of the central body 2 are however shorter than the distance between these parts 22, 23 in the state shown in FIG. 1*a*. By pulling the Bowden cables 27, this distance can be changed, in particular reduced, wherein an uneven pulling on the Bowden cables 27 in the case of a flexible borescope shaft 13 also allows a bending of the shaft 13 in the region of the centering aid 1 and hence an orientability of the borescope head 12.

FIG. 1*b* shows the assembly 1 or centering aid 1 in the state which arises when all Bowden cables 27 are pulled evenly, whereby the distance between the two inner parts 22, 23 of the central body 2 is reduced to the distance predefined by the spacers 29 arranged in-between.

Because of the described configuration of the central body 2 and the spacers 29, the distance of the parts 21, 23 or 22, 24 of the central body connected by a set 25 of strips 26, and hence the distance between the two guide points 26' of each strip, is reduced. Since the length of the strips 26 between the two guide points 26' remains constant (whereby also the ratio of the spacing of the guide points 26' and the length of the strips 26 between the guide points 26' changes), the strips 26 buckle similarly to the fourth Euler buckling case. Because of the pre-curvature of the strips 26 (see FIG. 1*a*), their rectangular cross-section and that of the borescope shaft 13 routed through the passage channel 3 as a block, the strips 26 and hence the spacer device 4 expand outward. As the two sets 25 of strips 26 are arranged offset in the longitudinal direction of the central body 2 because of the spacers 29 between the respective parts 21, 22 or 23, 24 of the central body 2 on which the guide points 26' of the strips 26 are situated, the points of maximum radial expansion of the strips 26 of the two sets 25 are also offset in said longitudinal direction. This gives the possibility of support in two support planes 5 spaced apart from one another.

The strips 26 are made of elastically deformable plastic such that, starting from the state shown in FIG. 1*b*, the centering aid 1 returns to the starting position shown in FIG. 1*a* when the Bowden cables 27 are fully released.

Figure 2:
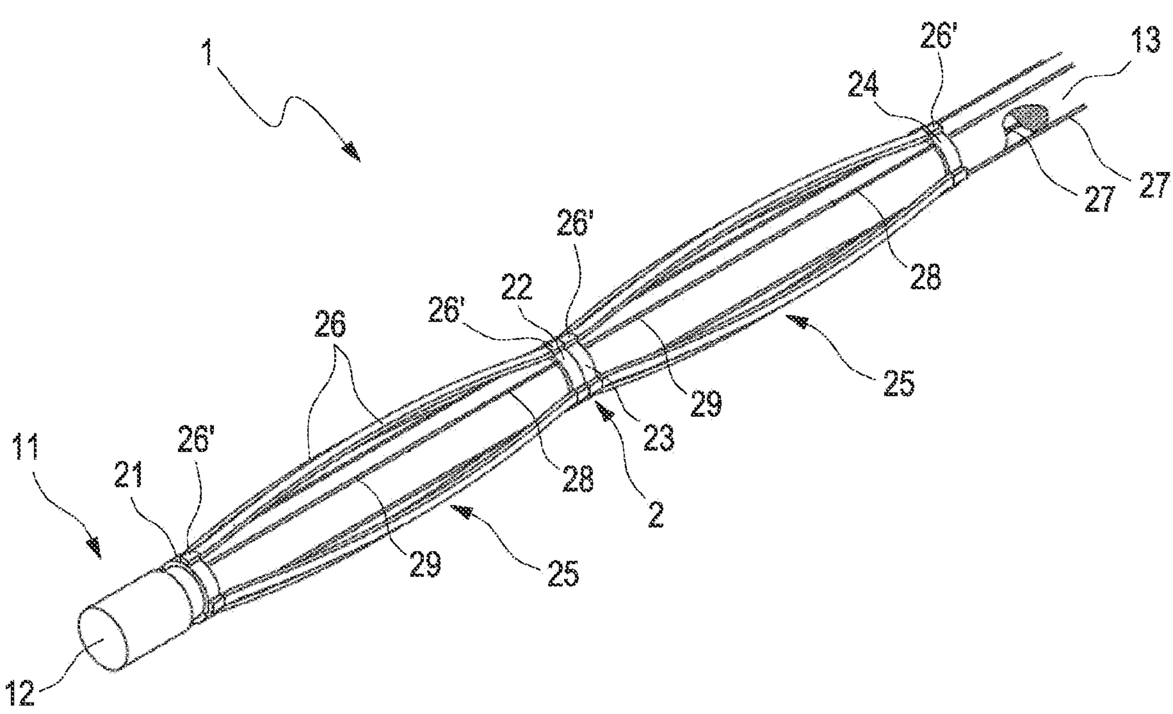
FIG. 2*a* and FIG. 2*b* show a second exemplary embodiment of a centering aid according to the present disclosure.
Figure 2:
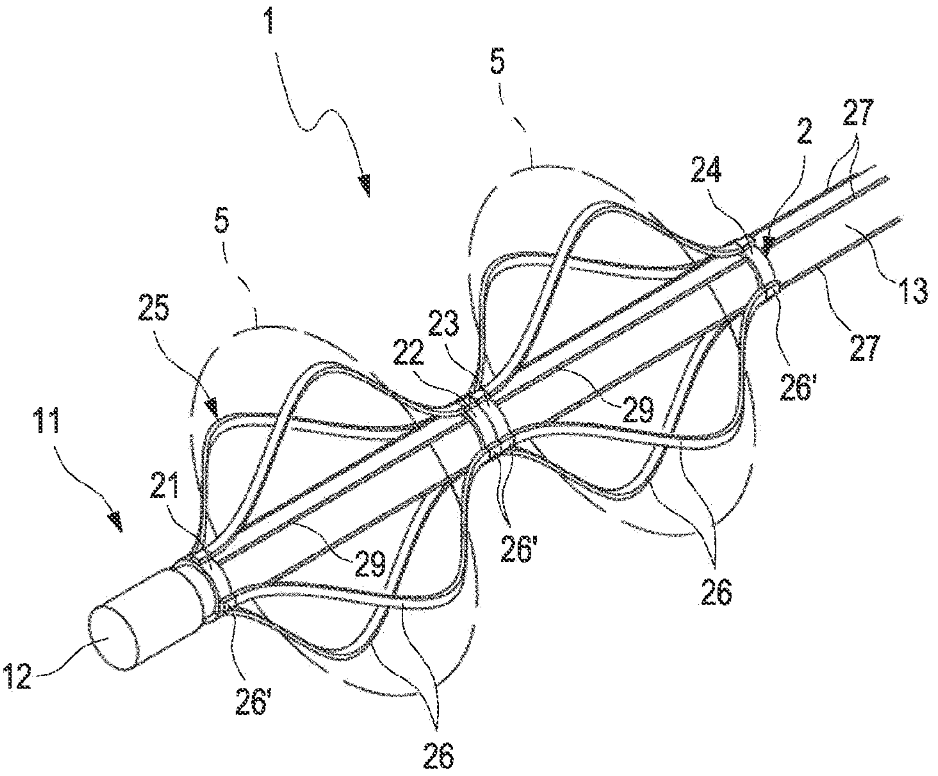

FIG. 2 shows a second exemplary embodiment of a centering aid 1 according to the present disclosure, which in principle is constructed and arranged similarly to the exemplary embodiment from FIG. 1, so the above statements remain broadly valid.

The centering aid 1 from FIG. 2 again comprises a central body 2 divided into four annular parts 21-24 spaced apart from one another in the longitudinal direction, wherein however only the annular part 21 closest to the borescope head 12 is attached fixedly to the borescope shaft 13 by force fit and/or substance bonding, while the other annular parts 22, 23, 24 are displaceable along the borescope shaft 13. The annular parts 21-24 form a passage channel 3 through which the borescope shaft 13 is routed.

As a spacer device 4, in each case two sets 25 of four elastically deformable strips 26 are provided, which are evenly distributed over the circumference and each have a rectangular cross-section, wherein the shorter side length runs towards the central body 2 in practically the radial direction. With the first set 25 of strips 26, the two parts 21, 22 of the central body 2 are connected together, i.e. the guide points 26' of the strips 26 concerned are arranged on the two parts 21, 22. The second set 25 of strips 26 similarly connects the parts 23, 24. The strips 26 of both sets 25 are formed integrally with the parts 21, 22 or 23, 24 of the central body 2 which they connect. In particular if the part 21 of the central body 2 is attached to the borescope shaft 13 by substance bonding, the two sets 25 of strips with the respective parts 21-24 may be constructed completely identically to one another, which simplifies production of the centering aid 1 as a whole.

In total, four Bowden cables 27 are provided, which are distributed over the circumference of the central body 2 and routed along the shaft 13 to its remote end. The one end of the inner traction wires 28 is attached to the part 21 of the central body 2 closest to the borescope head 12. In addition, the traction wires 28 of the Bowden cables 27 are guided in spacers 29 in the regions between the parts 21, 22 or 23, 24 of the central body 2, wherein the spacers 29 are in principle shorter than the distance between these parts 21, 22 or 23, 24 in the state shown in FIG. 2*a*. By pulling the Bowden cables 27, this distance can be changed, in particular reduced, wherein an uneven pulling on the Bowden cables 27 in the case of a flexible borescope shaft 13 also allows a bending of the shaft 13 in the region of the centering aid 1 and hence an orientability of the borescope head 12.

FIG. 2*b* shows the assembly 1 or centering aid 1 in the state which arises when all Bowden cables 27 are pulled evenly, whereby the distance between the two outer parts 21, 24 of the central body 2 is reduced. Already, because of the elastic deformation of the strips 26 but at the latest because of the spacers 29 and the movability of the two parts 22, 23, these parts 22, 23 are also moved so that the distances between the guide points 26' of the individual strips 26 is reduced, such that they are all expanded outward as shown. Since the length of the strips 26 between the two guide points 26' remains constant (whereby also the ratio of the spacing of the guide points 26' and the length of the strips 26 between the guide points 26' changes), here too the strips 26 buckle similarly to the fourth Euler buckling case. Because of the pre-curvature of the strips 26 (see FIG. 2*a*), their rectangular cross-section and that of the borescope shaft 13 routed through the passage channel 3 as a block, the strips 26 and hence the spacer device 4 expand outward.

As the two sets 25 of strips 26 are arranged one behind the other in the longitudinal direction of the borescope shaft 13, the points of maximum radial expansion of the strips 26 of the two sets 25 are also offset in said longitudinal direction. This gives the possibility of support in two support planes 5 spaced apart from one another.

The strips 26 are made of elastically deformable plastic such that, starting from the state shown in FIG. 2*b*, the centering aid 1 returns to the starting position shown in FIG. 2*a* when the Bowden cables 27 are fully released.

Figure 3:
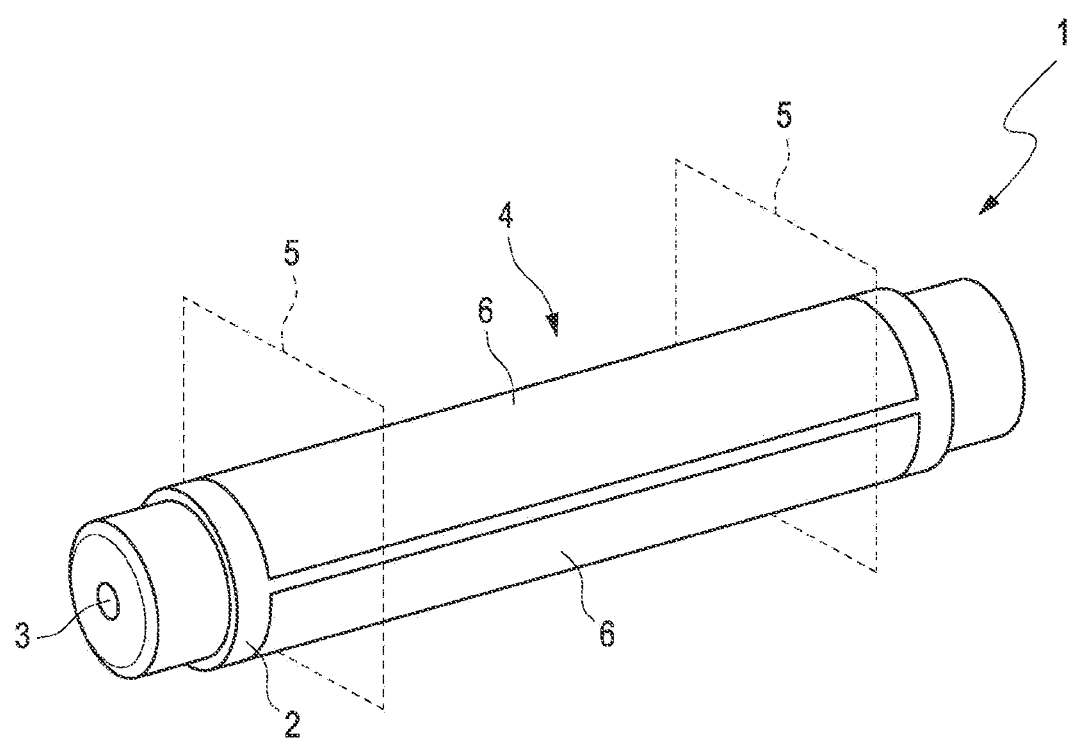
FIG. 3*a* and FIG. 3*b* show a third exemplary embodiment of a centering aid according to the present disclosure.
Figure 3:
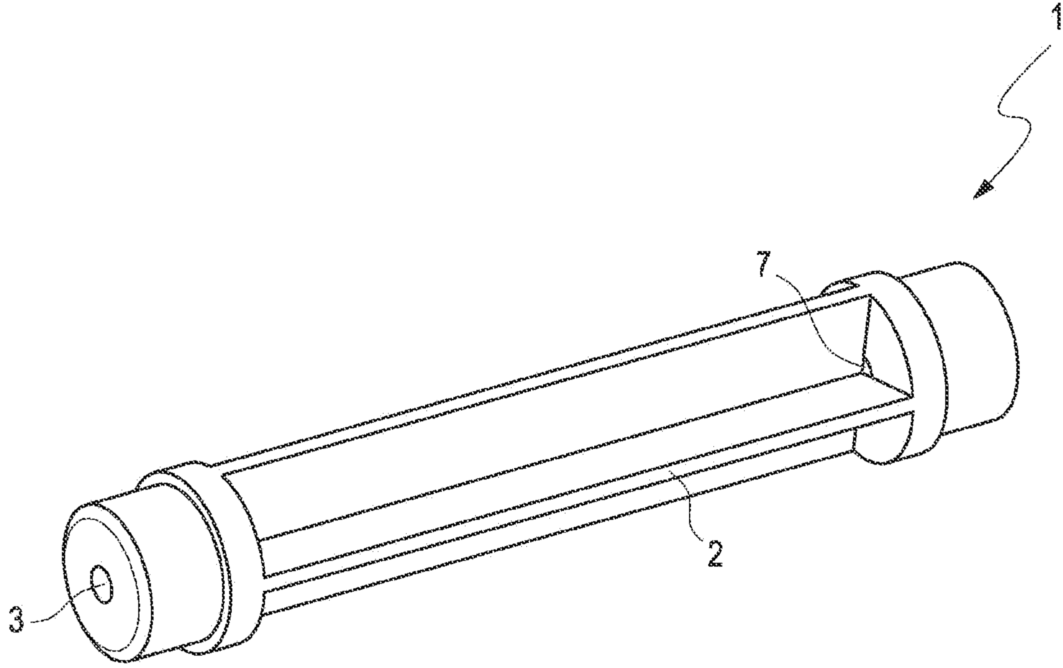

FIG. 3 shows a third exemplary embodiment of a centering aid 1 according to the present disclosure, wherein FIG. 3*a* shows the centering aid 1 itself, and FIG. 3*b* shows only the central body 2 of the centering aid 1. The centering aid 1 in FIG. 3 is also part of the assembly 10 in FIG. 4, to which additional reference is made.

The centering aid 1 comprises an elongate central body 2 with a passage channel 3 through which, in the usage state with a borescope 11 (see FIG. 4), the borescope lines can be routed to the borescope head 12. A spacer device 4 is arranged on the central body 2, the extent of which in the radial direction can be changed variably so that the spacer device 4 can support the central body at least in the two indicated support planes 5 which run perpendicularly to the longitudinal direction of the central body 2, for example against the inner wall of a cavity of a technical device to be inspected, such as an aircraft engine.

In the exemplary embodiment of FIG. 3, the spacer device 4 comprises four air cushions 6 which are distributed around the circumference of the central body 2 and extend in the longitudinal direction of the central body 2, as components which can be individually expanded outward in the radial direction in a controlled fashion. To control this radial expansion of the air cushions 6, an individual compressed air supply is provided for each air cushion in the form of a compressed air channel 7, through which, via compressed air lines connected thereto and routed through the borescope shaft 13, compressed air can be introduced or evacuated from the air cushions 6. The compressed air source and control valves necessary for this may be arranged at the end of the borescope shaft 13 remote from the centering aid 1.

The air cushions 6 are each made of a highly elastic and temperature-resistant material which allows expansion over 2000% and temperatures up to 80° C. The air cushions 6 are designed for an internal pressure of maximum 5 bar at which they deploy their maximum expansion in the radial direction (see FIG. 2*b*).

Figure 4:
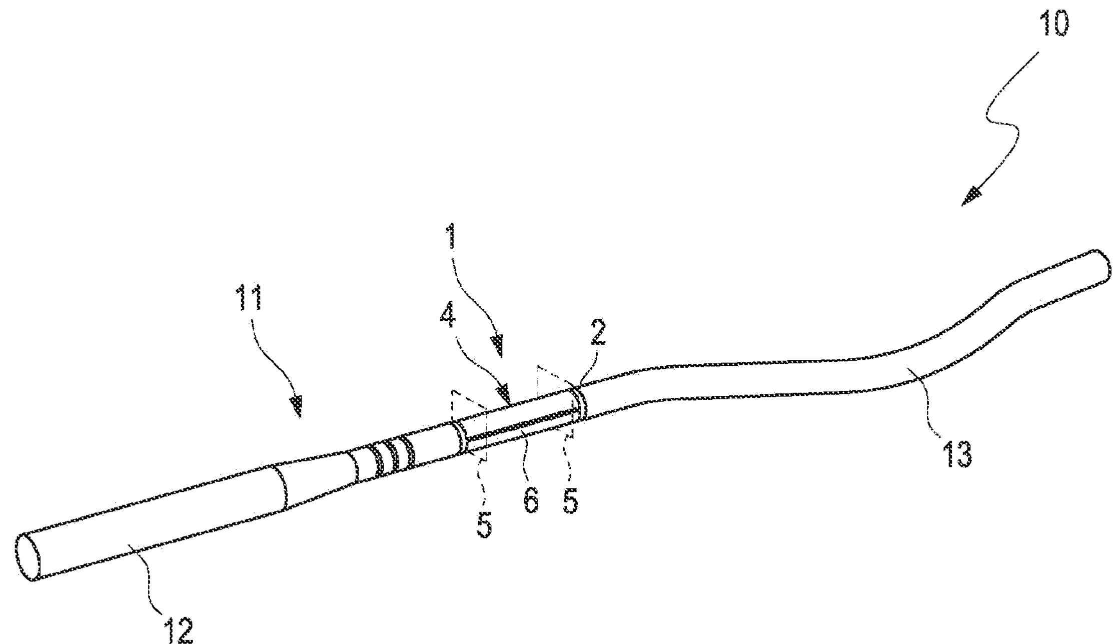
FIG. 4*a* and FIG. 4*b* show an exemplary embodiment of an assembly comprising a centering aid according to FIG. 3*a* and FIG. 3*b;*
Figure 4:
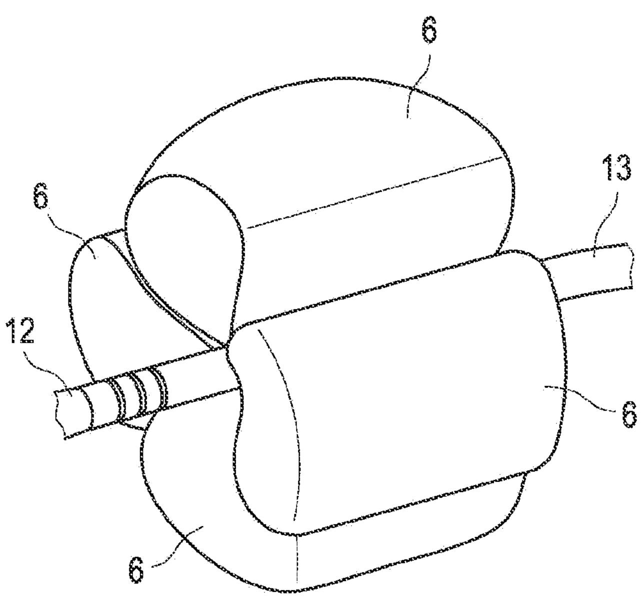

FIG. 4 shows the centering aid 1 from FIG. 3 when used in an assembly 10 according to the present disclosure. As well as the centering aid 1, the arrangement 10 also comprises a borescope 11 with a borescope head 12 and a flexible borescope shaft 13, in which run not only the borescope lines but also the above-mentioned compressed air lines for the supply of compressed air to the air cushions 6 of the centering aid 1. The borescope head 12, which is configured according to the prior art, is arranged on the one side of the centering aid 1 while the borescope shaft 13 terminates flush with the other end of the centering aid 1, so that only the borescope lines need be routed through the passage channel 3 of the central body 2 of the centering aid.

FIG. 4*a* shows the assembly 10 according to the present disclosure with fully deflated air cushions 6 and hence "retracted" spacer device 4. In this state, the cross-section of the centering aid 1 or the central body 2 determining this cross-section, perpendicular to the guide channel 3, is smaller than the cross-section of the borescope head 12.

In FIG. 4*b*, which shows a partial illustration of FIG. 4*a*, all four air cushions 6 are loaded with the maximum permitted pressure of 5 bar. The air cushions 6 thus have their maximum radial extent, in particular also in the two support planes 5 (see FIG. 1*a*). The central body 2 and hence also the borescope head 12 connected thereto, when inserted in a technical device, can be supported by the inflated air cushions 6 on the inner wall of a cavity of the technical device. By individual control of the compressed air supply to the individual cushions 6, the position achievable by the centering aid and/or the orientation of the central body 2 or borescope head 12 can be set within certain limits.

Figure 5:
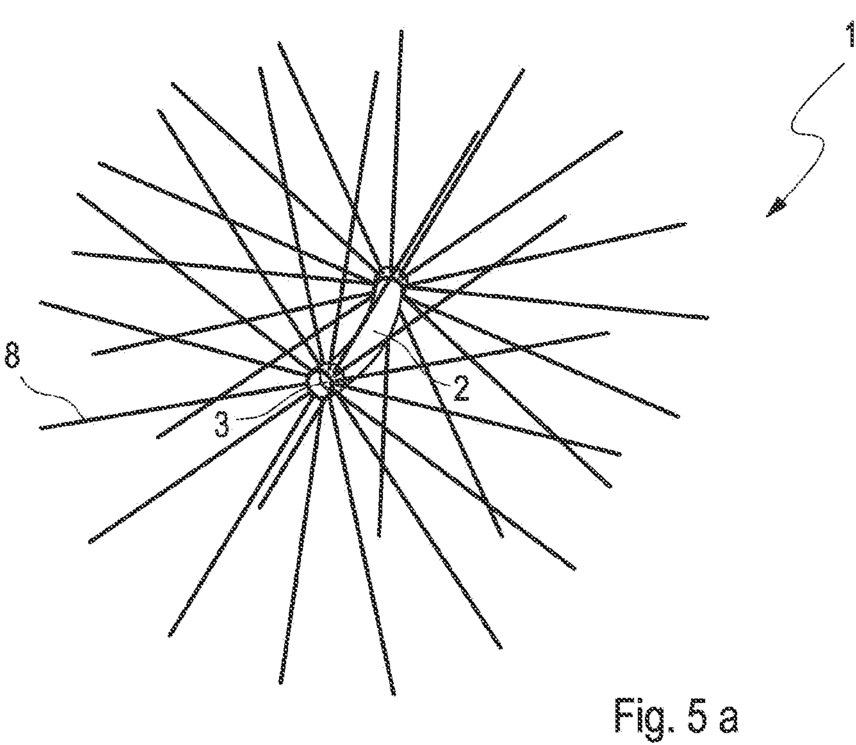
FIG. 5*a* and FIG. 5*b* show a fourth exemplary embodiment of a centering aid according to the present disclosure.
Figure 5:
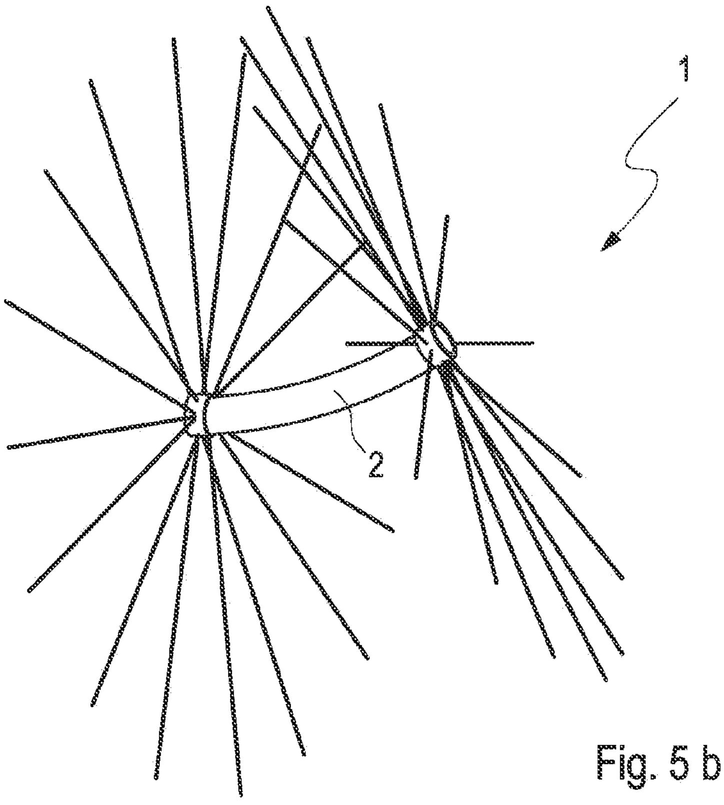

FIG. 5 shows a fourth exemplary embodiment of a centering aid 1 for borescopes according to the present disclosure.

The centering aid 1 comprises a central body 2, the passage opening 3 of which is configured such that the borescope shaft 13 of a borescope 11—and not only the borescope lines (see FIG. 4*a*)—can be routed through this. As a result, usually it is not necessary to adapt the borescope 11 for use with this centering aid 1.

The central body 2 is again designed flexibly so that a borescope 11 inserted therein with flexible borescope shaft 13 remains flexible even in the region of the centering aid 1.

Flexible bristles 8, which extend radially and are distributed over the circumference of the central body 2, are provided on both ends of the central body 2. The bristles 8 each form a respective support plane at the respective ends of the central body 2.

The bristles 8 are designed flexibly such that the centering aid 1 or a borescope equipped therewith can still be introduced into a technical device through a borescope opening provided for this. At the same time, they are sufficiently stiff to support the central body 2 or a borescope routed through this against the inner wall of a cavity of a technical device in which a corresponding assembly has been inserted.

Figure 6:
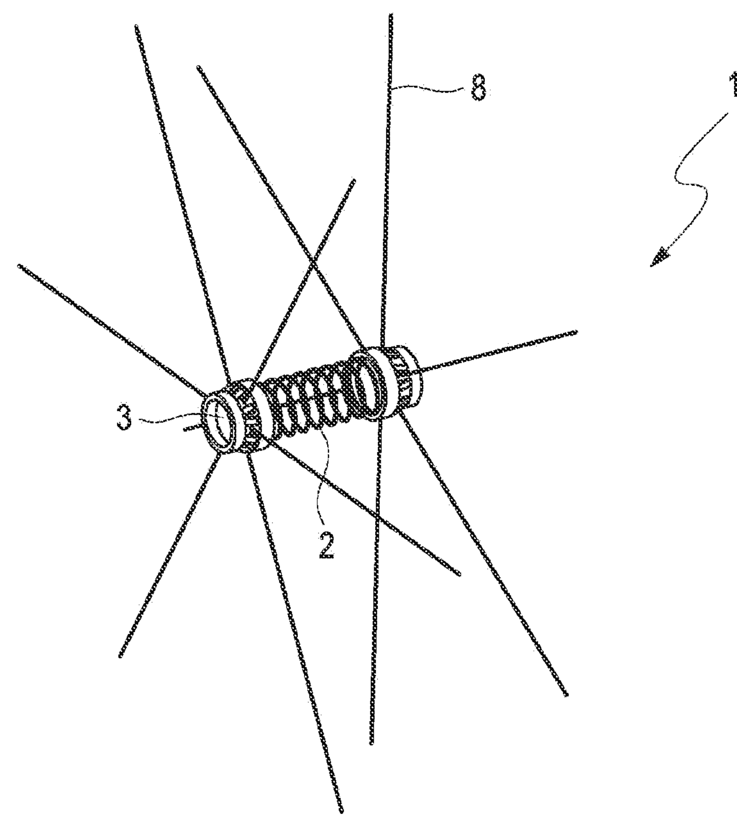
FIG. 6*a* and FIG. 6*b* show a fifth exemplary embodiment of a centering aid according to the present disclosure.
Figure 6:
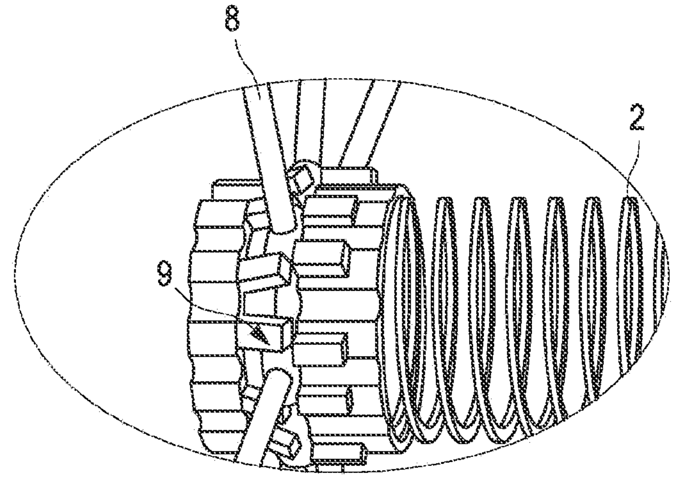

FIG. 6 shows a variant of the exemplary embodiment from FIG. 5 as a fifth exemplary embodiment of a centering aid 1 according to the present disclosure. Reference is therefore made to the above statements and only the differences between the two exemplary embodiments are described below.

In the exemplary embodiment in FIG. 6, the central body 2 of the centering aid 1 is designed as a coil spring whereby the central body 2 is still flexible in the longitudinal direction, but on corresponding bending again returns to the straight form illustrated.

In addition, the bristles 8 are spring-mounted on the central body 2 via a respective joint 9, shown in the detail illustration of FIG. 6*b*, such that the bristles 8 are each pivotable about an axis perpendicular to the longitudinal direction of the central body 2. The bristles 8 can thus lie directly on the central body 2 or pivot into a position parallel to the longitudinal direction of the central body 2 but pointing away from this, which facilitates insertion of the centering aid 1 or borescope equipped therewith through a borescope opening of usually small diameter. Because of the sprung design of the joints 9, the bristles 8 in principle return to the position shown in FIG. 6*b*.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for centering a borescope, the device comprising:

an elongate central body with a passage channel for a borescope line and with a spacer device, the spacer device extending variably in a radial direction over a circumference of the central body, and the spacer device being configured to support the central body in at least two support planes which are mutually spaced apart along the central body and run perpendicularly to a longitudinal direction of the central body, wherein the spacer device has at least two sets, which are offset in the longitudinal direction of the central body, of at least three elastically deformable strips distributed over the circumference, wherein each strip of the strips is guided at two guide points spaced apart in the longitudinal direction of the central body, and each strip of the strips is expandable radially outwards by changing a ratio of a distance between the two respective guide points and a length of the respective strip between the two respective guide points, wherein the central body is divided into at least two parts comprising a first part and a second part, and wherein a distance between the two parts of the central body is changeable via Bowden cables, and at least two individually actuatable Bowden cables are provided, which are distributed over the circumference.

2. The device as claimed in claim 1, wherein a variable extent of the spacer device in the radial direction is ensured by elastic deformability of at least one radially extending component of the spacer device or by at least one component which is expandable outwards in the radial direction in a controlled fashion.

3. The device as claimed in claim 1, wherein at least one strip of the strips is expandable radially outwards by changing the distance between the two respective guide points while a length of the strip between the two respective guide points remains the same.

4. The device as claimed in claim 1, wherein a distance between at least two of the at least two parts of the central body along the borescope line routed through the passage channel is variable, and at least one strip of the strips is fixedly attached to a respective guide point of the guide points on a respective one of the two parts of the central body.

5. The device as claimed in claim 1, wherein the at least two sets of strips are arranged overlapping or completely one behind the other in the longitudinal direction of the central body.

6. The device as claimed in claim 1, wherein the strips of a respective set at their respective first guide point are attached to a first common part of the central body, and at their respective other guide point to a second common part of the central body, wherein the first part of the central body is attachable axially immovably to the borescope line inserted through the passage channel, and the second part of the central body is designed to be axially displaceable relative to the borescope line inserted through the passage channel.

7. The device as claimed in claim 1, wherein the first or second parts of the central body are at least partially formed as one piece, or spacer elements are provided for determining a minimum mutual spacing of the at least two parts of the central body.

8. The device as claimed in claim 1, wherein the spacer device comprises at least one air cushion which is arranged on the central body and extends in the longitudinal direction of the central body and which is inflatable and deflatable via a compressed air supply.

9. The device as claimed in claim 8, wherein two or more air cushions are provided which are distributed over the circumference and are individually inflatable and deflatable.

10. The device as claimed in claim 8, wherein the at least one air cushion is made of elastic and/or temperature-resistant material, either of which allow expansions of more than 2000%, temperatures up to 80° C., or an expansion with an internal pressure of 0.5 to 5 bar.

11. The device as claimed in claim 1, wherein the central body is flexibly bendable in the longitudinal direction.

12. The device as claimed in claim 1, wherein the device further comprises a borescope with a borescope head at one end of a borescope shaft in which the borescope line runs wherein the centering aid is arranged directly adjacent to the borescope head and the borescope line is routed through the passage channel of the centering aid.

13. The device as claimed in claim 12, wherein the borescope shaft is routed through the passage channel of the centering aid or terminates flush with the centering aid.

14. The device as claimed in claim 12, wherein the cross-section of the central body perpendicular to the passage channel is smaller than or equal to the cross-section of the borescope head.

15. A device for centering a borescope, the device comprising:

a centering aid comprising an elongate central body with a passage channel for a borescope line and with a spacer device, the spacer device extending variably in a radial direction over a circumference of the central body, and the spacer device being configured to support the central body in at least two support planes which are mutually spaced apart along the central body and run perpendicularly to a longitudinal direction of the central body, wherein the spacer device has radially extending, flexible bristles distributed over the circumference of the central body, and wherein at least some of the flexible bristles are spring-mounted on the central body such that a corresponding bristle is pivotable about an axis perpendicular to the longitudinal direction of the central body.

16. The device as claimed in claim 15, wherein the device further comprises a borescope with a borescope head at one end of a borescope shaft in which the borescope line runs, wherein the centering aid is arranged directly adjacent to the borescope head and the borescope line is routed through the passage channel of the centering aid, wherein the borescope shaft is routed through the passage channel of the centering aid or terminates flush with the centering aid, and wherein the cross-section of the central body perpendicular to the passage channel is smaller than or equal to the cross-section of the borescope head.

17. The device as claimed in claim 15, wherein the central body is flexibly bendable in the longitudinal direction.

18. The device as claimed in claim 15, wherein the device further comprises a borescope with a borescope head at one end of a borescope shaft in which the borescope line runs, and wherein the borescope shaft is routed through the passage channel of the centering aid or terminates flush with the centering aid.

19. The device as claimed in claim 18, wherein the cross-section of the central body perpendicular to the passage channel is smaller than or equal to the cross-section of the borescope head.

* * * * *